United States Patent [19]

Edixhoven

[11] 4,420,862

[45] Dec. 20, 1983

[54] APPARATUS FOR MAKING SLATS FOR A SLATTED BLIND

[75] Inventor: Gerardus H. Edixhoven, Voorschoten, Netherlands

[73] Assignee: Hunter Douglas International N.V., Curacao, Netherlands

[21] Appl. No.: 273,042

[22] Filed: Jun. 12, 1981

[30] Foreign Application Priority Data

Jul. 1, 1980 [DE] Fed. Rep. of Germany ....... 3024832

[51] Int. Cl.$^3$ .............................................. B23P 19/00
[52] U.S. Cl. ...................................................... 29/24.5
[58] Field of Search .............. 29/24.5, 33 R; 92/85 A, 92/85 B, 84, 143; 188/170, 181 R

[56] References Cited

U.S. PATENT DOCUMENTS

| | | | |
|---|---|---|---|
| 2,893,106 | 7/1959 | Rosenbaum | 29/24.5 |
| 2,917,810 | 12/1959 | Wilson | 29/24.5 |
| 3,531,838 | 10/1970 | Peeters | 29/24.5 |
| 3,555,864 | 1/1971 | Wegner | 29/24.5 |
| 3,766,815 | 10/1973 | Edixhoven | 29/24.5 |
| 3,835,753 | 9/1974 | Bunyard | 92/85 B |
| 4,188,693 | 2/1980 | Edixhoven | 29/24.5 |

FOREIGN PATENT DOCUMENTS

| | | | |
|---|---|---|---|
| 322538 | 11/1972 | U.S.S.R. | 92/85 B |

*Primary Examiner*—E. R. Kazenske
*Assistant Examiner*—Paul M. Heyrana, Sr.
*Attorney, Agent, or Firm*—Pennie & Edmonds

[57] ABSTRACT

Apparatus for making slats for a slatted blind, in which the slat material is fed by a first drive to form a loop from which it is fed on to a discharge table at which the strip material is cut into slats and the holes are punched. The loop causes an advancing member to be pushed back against the action of a spring and this spring then, upon receipt of a signal, urges the advancing member, and thus the loop, into the discharge station for further operations to be carried out.

12 Claims, 5 Drawing Figures

APPARATUS FOR MAKING SLATS FOR A SLATTED BLIND

DESCRIPTION

The invention relates to an apparatus for making slats for a slatted blind.

One known form of such apparatus includes stamping and cutting stations, with a first drive which draws a strip of material off from a supply roll, a guide channel which the strip of material runs through to form a loop, a second drive which conveys the strip of material from the guide channel to a discharge table, the machining stations or assembly stations being located in the region of the discharge table, and, on the discharge table, an end stop predetermining the length of the finished slat.

In an apparatus of this type, the first drive usually includes an electric motor and a reducing gear which drive a pair of cylinders or rollers through which runs the strip of material. The drive speed is adjustable. The strip of material is driven again downstream of the guide channel, in the feed direction, by the second drive, for example an electrically driven roller or a linear motor, the loop located between the two drives being intended always to provide a sufficiently long strip of material already drawn off from a supply roll and, if appropriate, also straightened, for conveyance to the discharge table. The speed of advance of the strip of material in the direction of the discharge table depends on the particular work cycle of the apparatus and, especially, on the production speed. This speed is often limited, because the strip of material to be fed to the discharge table must be guided very precisely and must assume a very precise position on the discharge table.

Consequently, the strip of material has to be fed to the discharge table in a timed sequence and so that the strip of material is conveyed further, in each case, by the length corresponding to the length of the next slat to be made. Since this feed can be effected only with great difficulty by rotary drives, so-called linear motors have, among other things, also been used hitherto for feeding the strip. However, the use of motors of this type represents a relatively large technical and financial outlay. Also, the speed of conveyance which can be achieved by means of these motors is limited if very narrow and thin material is involved.

The object of the invention is, therefore, to reduce the technical and financial outlay required for an apparatus of the type mentioned in the introduction, simultaneously also to achieve an increase in the possible speed of conveyance, while, nevertheless, in so doing, making it possible for the apparatus to be used for all existing qualities, dimensions and shapes of the strip of material.

According to the present invention, there is provided apparatus for making slats for a slatted blind, said apparatus comprising means for mounting a supply roll of slat-forming strip material; first drive means to draw strip material from said supply roll; a guide channel positioned to receive strip material from the first drive means to form a loop thereof; a discharge table positioned to receive strip material from said loop in said guide channel; machining and/or assembly stations positioned in the region of said discharge table; an end stop associated with said discharge table for determining the length of the finished slat; an advancing member movable in the longitudinal direction of said guide channel and engageable by the end of said loop and resilient means urging the bent-over end of the loop towards said discharge station.

The force required to displace the advancing member and to tension the resilient means is therefore applied by the first drive and is transmitted by the strip of material to the advancing member. The more the resilient means is tensioned, the stronger becomes the force exerted thereby on the strip of material in the region of the loop. Consequently, when a greater length of the loop has to be preset in the case of relatively large slats, the resilient means is tensioned correspondingly more strongly. This, in turn, results in a higher advancing speed, when further feeding onto the discharge table is allowed, so that longer slats hardly need any more time for this than shorter slats. When further feeding onto the discharge table is allowed depends, in particular, on the work cycle of the machine in question. Permission is given when a slat is finished and the discharge table is free again.

The construction of the invention permits several advantages, one of which is that a second active drive is no longer required for feeding the strip of material to the discharge table. The reduction in the technical and financial outlay, achieved as a result, resides not only in a saving of the second drive, but also in a corresponding simplification of the machine control. Another advantage is to be seen in the fact that the speed of feeding of the strip of material can be increased to double or even more. The output of the machine is therefore increased considerably.

Advantageously the advancing member comprises a concavely curved wall engageable by the outer surface of the end of the loop of the strip material. As a result, a good guidance of the strip of material in this region in which the feed direction changes by approximately 180° is guaranteed. It is also preferable if the engaging face of the advancing member is provided with a layer consisting of a material reducing the friction relative to the strip of material. The layer can consist, for example, of a soft textile or synthetic material of wool-like character.

In one particular embodiment, the advancing member comprises a base part, and said guide channel comprises two laterally spaced apart guide rails, a groove being formed in each rail with the grooves facing one another, said base part being slidably mounted in said groove, and said resilient means engages one end of said base part. Two or even more resilient members can therefore be provided as the resilient means, and it is favourable if these engage, if possible, symmetrically on the base part or on the advancing member. For example, a tension spring made of suitable steel or else an India-rubber band made of rubber or a similar material can be used as a resilient member, within the scope of the invention.

Desirably, the guide channel can have a stop limiting the returning and conveying movement of the advancing member. By means of this stop, the advancing or feeding movement can be terminated at a point where the force of the resilient means used is, perhaps, no longer adequate for a sufficiently rapid feeding of the strip of material. The stop may comprise a roller engagable with the inner surface of the end of the loop, when a loop of a predetermined smallest length is reached, and wherein the radius of the roller is slightly less than the radius of curvature of the concavely curved wall.

In the design of the resilient members or springs used in a particular case, it is therefore necessary to ensure that the resilient force is strong enough, or increases so sharply, at least during the tensioning operation, that a feeding of the strip of material in the direction of the discharge table can be effected even when the fist drive is running and, consequently, against the oppositely acting forces issuing from this drive. If the first drive is set to a certain drive speed in dependence on the slat length in question, it is possible to ensure that an equilibrium of all the forces can be maintained, when the first drive is running and, consequently, when the strip of material continues to be fed into the guide channel and when that part of the strip of material located behind the loop arc is fed simultaneously in the direction of the discharge table.

Advantageously a sensor is positioned to detect the length of the loop, said sensor being operatively connected to the drive to said first drive means to reduce the speed of, or switch off, the first drive means when a predetermined length is exceeded, and to switch on or increase the speed of said first drive means, when loop length falls below the predetermined value. If such a sensor is provided and controls the first drive accordingly, there is no longer any need to have to set a different drive speed for each slat length.

As a result of the design according to the invention, such a high feed speed can be achieved that it may be appropriate, if the occasion arises, not to cause the end of the slat strip fed onto the discharge table to run up against a fixed end stop. It is therefore proposed that the end stop which is located on the discharge table and against which the advancing member pushes the strip of material includes a stop body which can be displaced against the effect of a braking force until the end position is reached, and that the braking characteristic of the end stop is designed so that the braking force is reduced or becomes completely ineffective shortly before the end position is reached.

The end stop may include a fixed piston, a cylinder axially movable relative to the piston, an end stop body on said cylinder, and an exhaust opening to the cylinder, the size of the opening determining the speed at which air within said cylinder flows out of said cylinder as it is moved relative to said piston, and thereby determining the braking effect. The smaller the exhaust opening is dimensioned, the greater is the braking effect, because the air can flow out correspondingly more slowly.

In one particular embodiment, the piston is fixed and is mounted at one end, the open end of the cylinder being passed over the other end of the said piston and movable towards said one end, the said open end of the piston being provided with a reduced diameter portion leaving an annular clearance between the piston and said portion, to form the exhaust opening, said piston comprising, adjacent to the said one end, a part of reduced section, whereby when said reduced diameter portion overlies said reduced cross-section part, the clearance increases shortly before the end position of the cylinder is reached.

Thus, an enlargement of the exhaust cross-section occurs automatically in the last-mentioned region, so that the air still present in the cylinder can escape abruptly and no longer generate any braking effect.

Preferably a thin helical spring surrounds the cylinder, an annular radially outwardly extending attachment is provided on the cylinder, one face of which is engageable by the strip material and forms the end stop surface, and the other face of which is engageable by said helical spring, whereby the spring can return the cylinder to its original position. This results in an especially simple construction. Because of the special design of the spring, the latter does not unduly influence the particular braking effect desired.

To detect as accurately as possible the point when the end position is reached by the slat, there can be inserted on the free end face of the piston a signal transmitter which transmits a signal when the end position of the cylinder is reached. The subsequent machining operation can be initiated by means of this signal. A cylinder made of plastic and having a metal piece inserted into the cylinder bottom can advantageously be used, and a sensor responding to metal can be used as a signal transmitter.

To enable such an end stop to be designed and mounted as simply and as appropriately as possible, it is proposed that a holding device is provided for the end stop, a cylindrical bore being formed in said holding device, the diameter of which corresponds to the diameter of the annular attachment on the cylinder and acts to guide said annular attachment, and wherein at least one lateral slit communicates with said bore through which a finished slat can be pushed out. The end stop can therefore be inserted in a simple way into such a mounting. When the respective strip of material arriving is in the end position, after reaching which the machining can begin, the slit in the bore provides to the side, in a favourable way, the necessary free space for removing the finished slat.

The invention and its embodiments have been described, up to now, by the example of a machine in which the individual machining stations in the form of cutting and stamping heads are distributed, in a way known per se, over the length of the discharge table. However, the invention can advantageously also be applied, without restriction, to another type of the apparatus. For example, the machining stations may be assigned to a part of the apparatus which is located in front of the discharge table and on which the actual machining of the individual slats takes place. The discharge table can then be an integral part of an assembly arrangement, by means of which the finished slats are assembled into a blind and which is combined with the first-mentioned apparatus. In machines of this type, the transport and machining of a particular slat often take place in steps. Consequently, appropriate stops and signal transmitters which initiate the individual machining steps can be located on the discharge table. After an appropriate number of machining steps, the slat then reaches an end stop which initiates the cutting-off of the slat. Such machines are likewise known.

In order that the invention may more readily be understood, the following description is given, merely by way of example, reference being made to the accompanying drawings, in which.

Figure 1:
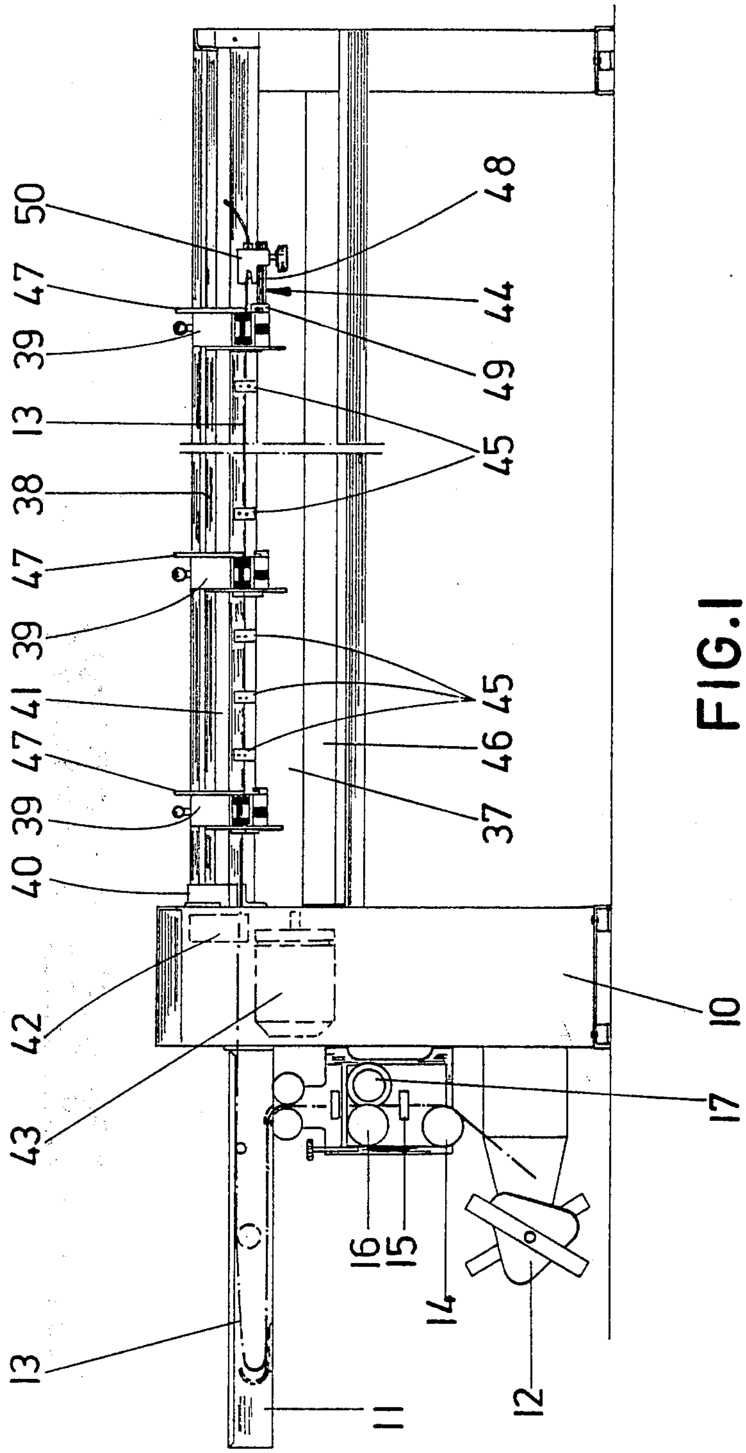
FIG. 1 is a schematic, simplified side elevation of a presently preferred embodiment of apparatus according to the invention.
Figure 2:
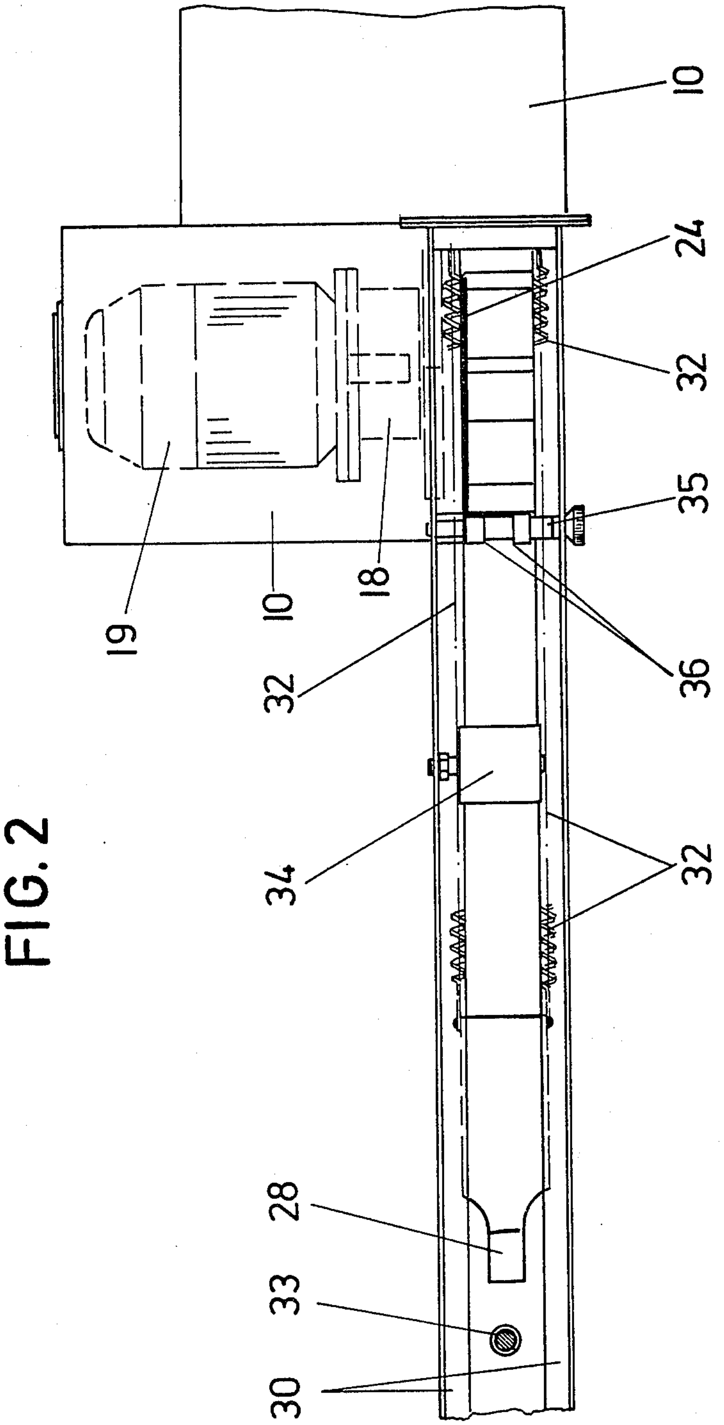
FIG. 2 is an enlarged plan view of a portion of the apparatus shown in FIG. 1.

The first embodiment of the apparatus illustrated in FIGS. 1 to 4 is a machine, by means of which slats for slatted blinds can be made, this machine including a horizontal guide channel 11 fastened to one side of the machine housing 10. Positioned underneath this guide channel is a device, by means of which a strip of material 13 is drawn off from a supply roll 12. This strip can consist, for example, of thin aluminium sheeting. The strip of material 13 already has, in general, a slightly curved cross-section, as is conventional in the slats of a slatted blind. The strip of material 13 runs over a first guide roller 14 and through a guide 15 to two drive rollers 16 and 17. These are driven by an electric motor 19 via a reducing gear 18. The drive rollers 16 and 17 are connected to one another via two gearwheels 20, so that slipping between the drive rollers 16 and 17 cannot occur. The drive roller 16 has a concavely curved peripheral face, whilst the drive roller 17 has a convex peripheral face of approximately the same curvature. The form of the curvature is adapted to the cross-sectional shape desired for the slats.

Although the strip of material 13 drawn off from the supply roll 12 can already have an appropriate shape, nevertheless, since the strip of material 13 has only a relatively small thickness, deformations are occasionally possible. These can be corrected by means of the drive rollers 16 and 17 which can be adjusted accordingly for this purpose. However, it also comes within the scope of the invention to use a flat strip of material which acquires its concavely curved cross-sectional shape only by means of the drive rollers 16 and 17.

After running through the drive rollers 16 and 17, the strip of material 13 passes through a further guide 21 to two deflection rollers 22 and 23 which are not driven, that is to say are freely rotatable. The deflection roller 22, on the left in FIG. 1, forms, together with a baffle plate 24, a guide for the strip of material 13, so that this can be deflected out of the vertical direction into the horizontal direction and can be guided into the guide channel 11 through an orifice not shown here.

Figure 3:
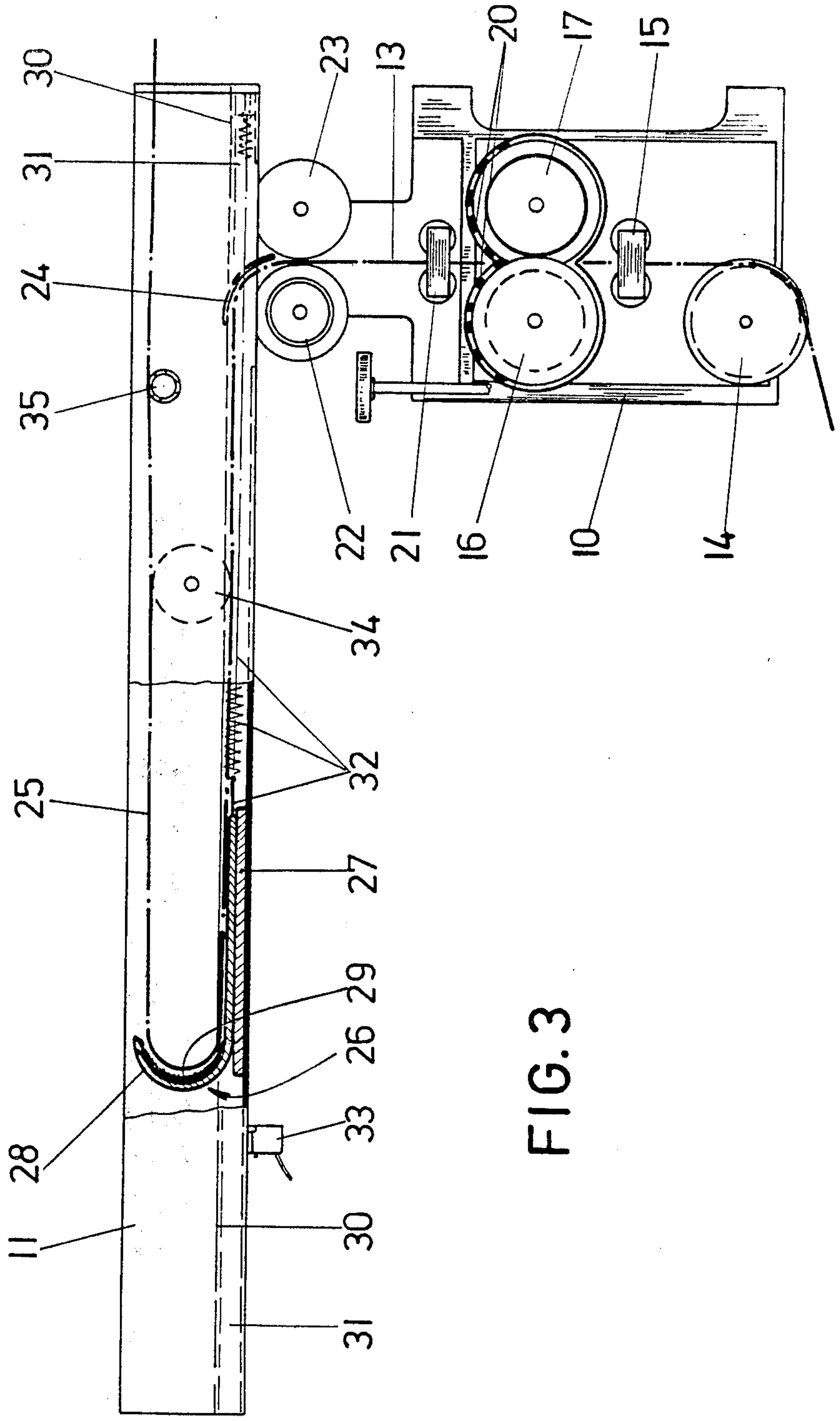
FIG. 3 is a side view of the portion of the apparatus shown in FIG. 2.

Within the guide channel 11, the strip of material 13 can form a loop 25 which runs in an arc of 180° in the region of reversal of the feed direction and which interacts in this region with an advancing member designated by the general reference numeral 26. The advancing member 26 consists, in particular, of a base 27 having on its left end an upstanding semicircular wall 28 the right side of which, as seen in FIG. 3, is concave. The inner side of the wall 28 is coated with a layer 29 of fibrous textile or synthetic material, the properties of which are selected so that the friction relative to the strip of material 13 is reduced.

The advancing member 26 is located, with its base 27, between two guide rails 30 which each have a groove 31 open towards the centre of the base 27. The grooves 31 each contain a spring 32 which is fastened with one of its ends to the base 27. The other end of the springs 32 is fastened to the end, on the right in FIG. 1, of the guide channel 11. The springs 32 are helical tension springs which are made of a suitable steel and the deflection length of which is made relatively long.

A sensor 33 in the form of a photocell is located at the curve of the guide channel 11. When the length of the loop 25 increases to such an extent that the loop 25 covers the sensor 33, the sensor 33 transmits a control signal which initiates a switching-off of the electric motor 19 and, consequently, prevents further feeding of the strip of material 13.

Also located in the guide channel 11 is a roller 34 which can rotate about a horizontal axis and the outside diameter of which is equal to or somewhat less than the inside diameter of layer 29 on the wall 28. The roller 34 serves as a stop and predetermines the shortest length of the loop 25 measured from the deflection rollers 22 and 23. The upper part of the loop 25 is, additionally, also conveyed over a guide roller 35 which can rotate about an axis extending transversely to the guide channel 11 and which is adjustable in the direction of this axis, that is to say in a transverse direction. The guide roller 35 has on its outer periphery two adjustable flanges 36, between which the strip of material 13 is laterally guided and its lower face bears on the surface of the roller between the flanges.

A discharge table 37 extends from the opposite side of the machine housing 10. This discharge table has a rear wall 38 which is designed in the form of a rail and on which, as required, any number of machining stations 39 can be arranged at any distance from one another. The machining stations 39 are, in general, stamping heads, by means of which the holes necessary in a particular slat are stamped out in a single working operation. All the machining stations 39, together with a further machining station 40 which will be described in particular below, are driven from a single, rectangular cross-section, drive shaft 41, which is driven by an electric motor 43 via a clutch 42 located within the machine housing 10. The clutch 42 is actuated by a control device of known design, not shown here, so that the drive shaft 41 is driven in a work cycle of 360° and is then switched off again. During this work cycle, the machining stations 39 and 40 carry out their machining operations.

The machining station 40 is a cutting mechanism, by means of which each slat is cut off from the strip of material 13 to a predetermined length. This takes place, in interaction with an end stop 44, on that machining station 39 which is furthest removed from the machining station 40. The strip of material 13 coming from the guide channel 11 passes through the machining station 40 and is guided, on its path between the further processing stations 39, between twin bars 45 (FIG. 4) which extend in the horizontal direction and which are likewise fastened to the rear wall 38 of the discharge table 37. The twin bars 45 are, like the machining stations 39 and the end stop 44, adjustable in the longitudinal direction of the discharge table 37. The front side of the discharge table 37 forms an ejection trough 46 (FIG. 1). The machining stations 39 each have an ejector 47 which pushes the finished slat into the ejection trough 46 after the conclusion of a work cycle.

Figure 4:
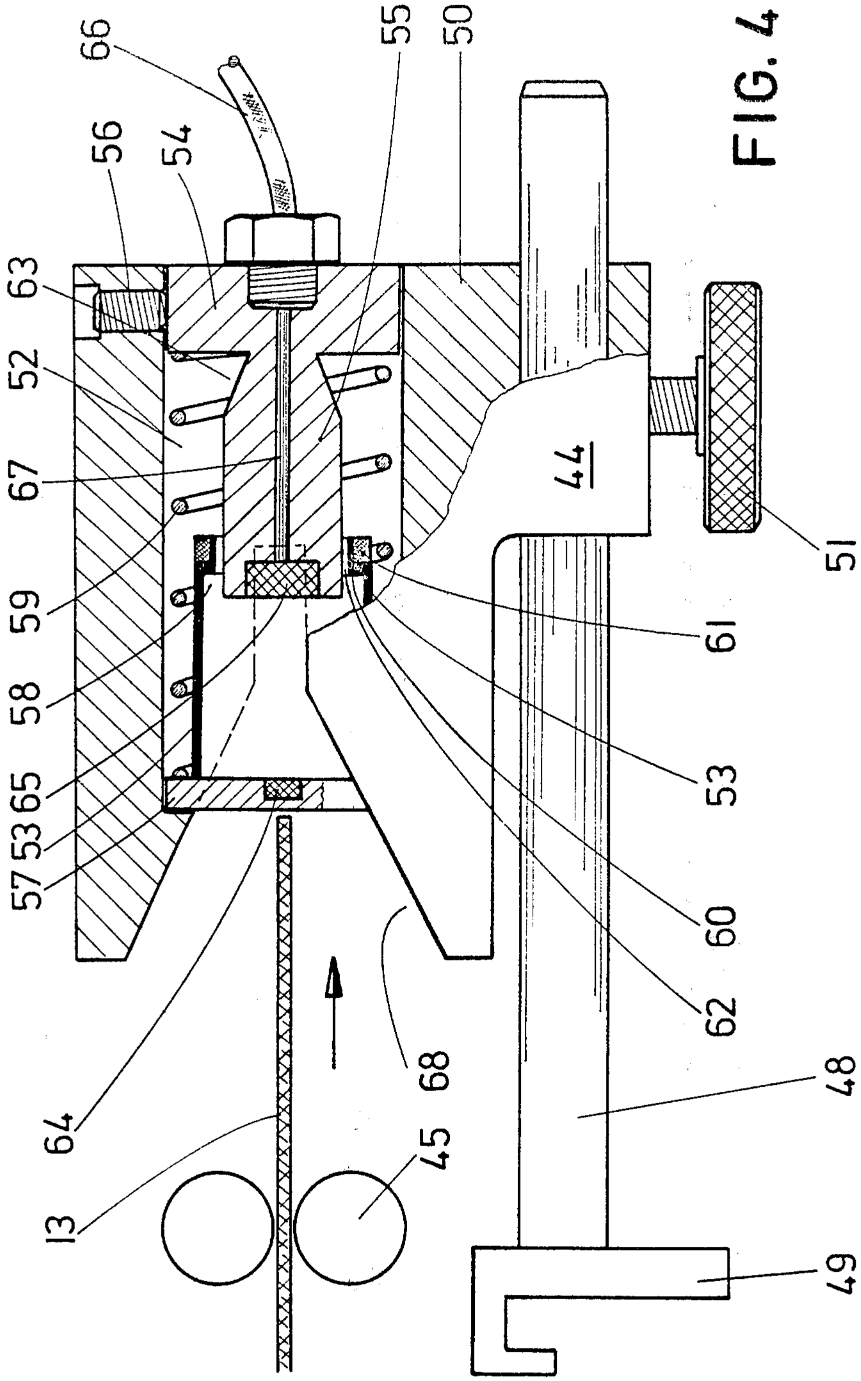
FIG. 4 is a side elevation, partly in section, through the end stop and its mounting of the apparatus of FIG. 1.

Referring to FIG. 4, it will be seen that the mounting 50 of the end stop 44 is shaped so that it has on each side a slit 68 which ensures a perfect ejection of each finished slat in a lateral direction. A horizontal support 48 of angular cross-section has, at one of its ends, a hook-shaped bracket 49, by means of which the support 48 can be suspended on the housing of any machining station 39. If, for example, after the manufacture of especially long slats, a changeover is to be made to the manufacture of very short slats, the end stop 44 can be dismounted, from the machining station 39 located furthest to the right in FIG. 1, and mounted on that machining station 39 which is the most favourable for making short slats or the position of which needs to be changed the least for this purpose.

A mounting 50 can be pushed onto the support 48 and fastened by means of a locking screw 51 in the position corresponding to the desired or determined slat length. The mounting 50 has a bore 52 extending in a horizontal direction and parallel to the longitudinal axis of the discharge table 37. Located in this bore are a cylinder 53 serving as a stop body and a mounting disc 54 which is connected to or is made in one piece with a piston 55. The mounting disc 54 and, consequently, also the piston 55 can be fixed in the bore 52 by means of a locking screw 56.

The cylinder 53 has, at one of its ends, an outer annular attachment 57, the outside diameter of which is, like the outside diameter of the mounting disc 54, adapted to the diameter of the bore 52. The cylinder 53 is surrounded by a thin and relatively weak helical spring 59 which is supported with one of its ends on the annular attachment 57 and with its other end on the mounting disc 54.

The cylinder 53 which is appropriately made of a suitable plastic is open in the direction of the mounting disc 54 and has at its margin an inwardly directed portion of reduction in cross-section 60 which is formed as a result of appropriate shaping of the plastic and the extent of which can be varied slightly by means of a metal ring 61 which can be pushed more or less far onto the portion 60. An annular gap 62 is formed between the portion 60 and the outer face of the piston 55. The size of cross-section of this annular gap 62 determines the braking effect, that is to say the speed, at which the cylinder 53 can be pushed onto the piston 55 with a certain force. The cylinder 53 is shown, in FIG. 4, in the position in which the strip of material 13 does not yet touch it. In its other end position, the portion 60 is located, in the vicinity of the mounting disc 54, over a part 63 of the piston 55, the cross-section of which diminishes conically in the direction of the mounting disc 54. This corresponds to an enlargement of the annular gap 62 when this cylinder position is reached, that is to say, the braking effect is very quickly reduced or even cancelled completely.

A metal piece 64 is inserted into the bottom of the cylinder 53 made of plastic. A signal transmitter 65 responding to metal is inserted into the end face of the piston 55. A line 66 leads from the signal transmitter 65 through a central bore 67 in the piston 55 to the outside. The line 66 leads to a control unit, not shown here, which serves, among other things, also to actuate the drive for the drive shaft 41.

In detail, the following mode of operation results:

By switching on the electric motor 19, the strip of material 13 is drawn off from the supply roll 12 and conveyed into the guide channel 11. After the loop 25 has formed, the strip of material 13 runs through the machine housing 10 up to the machining station 40. If the drive shaft 41 is not being actuated, that is to say, if no work cycle is to be carried out, the strip of material 13 is stopped by the cutting tool contained in the machining station 40. When the loop 25 has reached an appropriate size, the electric motor 19 is switched off again.

When the manufacture of individual slats now begins, the machining station 40 allows the strip of material 13 to be conveyed further up to the end stop 44. The latter brakes the strip of material 13 arriving at a relatively high speed. As soon as the end position in which the cylinder 53 is pushed as far as possible onto the piston 55 is reached, actuation of the machining stations 39 and 40 by the drive shaft 41 is initiated via the signal transmitter 65. This work cycle continues until all the cutting and stamping tools have executed their working operations and until the ejector 47 has ejected the finished slat. The machining station 40 then allows the next part of the strip of material 13 to advance. During one work cycle, the drive shaft 41 executes a rotation of 360°.

Because the loop 25 is formed in the guide channel 11, the advancing member 26 is moved in the direction of the sensor 33. During this time, that region of the strip of material 13 which constitutes the lower part of the loop 25 transmits the drive force coming from the drive rollers 16 and 17 to the advancing member 26 and displaces the latter in the direction of the sensor 33, the baffle plate 24 preventing the strip of material 13 from kinking out. In so doing, the two springs 32 are tensioned. The force stored in them causes the strip of material 13 to be conveyed further onto the discharge table 37, as soon as the machining station 40 has allowed this transport.

The time sequence or the machining speed, on the one hand, and the speed of the strip of material 13 when it enters the guide channel 11, on the other hand, can be coordinated with one another, so that the drive rollers 16 and 17 can run on continuously, the advancing member 26 moving to and fro between the sensor 33 and the roller 34, without triggering a response of the sensor 33 or touching the roller 34. Especially in the case of relatively high advancing speeds, a very favourable effect is provided by the fact that, on the one hand, the wall 28 of the advancing member 26 gives the loop 25 a good dimensional stability, whilst, on the other hand, the layer 29 guarantees as low a coefficient of friction as possible.

The further embodiment illustrated in FIG. 5 will be described below. In contrast to the embodiment described above, this is an apparatus by means of which the assembly of slatted blinds can also be carried out simultaneously.

This apparatus, already known in various embodiments, has a machine table 70 and a discharge table 71 shown only partially and diagrammatically. Two machining stations 72 are located on the upper side of the machine table 70 and one machining station 73 is located between these, all being actuated by a common drive shaft 74; the latter corresponds to the drive shaft 41 in the embodiment described above.

Figure 5:
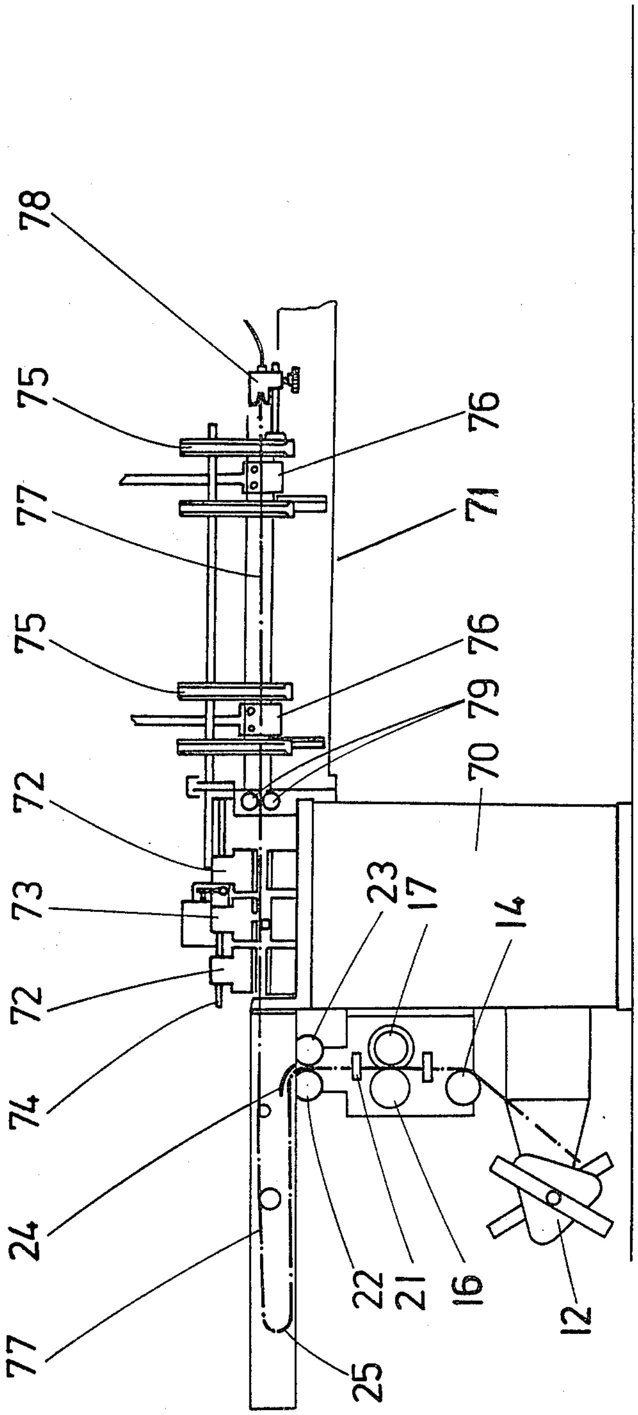
FIG. 5 is a schematic, simplified side elevation of a second embodiment of apparatus according to the invention vention, in which the slatted blind can also be assembled simultaneously.

That part of the apparatus shown in FIG. 5 which guides the strip of material 13 in the direction of the machining stations 72 and 73 corresponds in its construction and its mode of action to the embodiment described above with reference to FIGS. 1 to 4, so that, to that extent, the same reference numerals are contained in FIG. 5 and a further description of this part of the apparatus is superfluous.

Located in the region of the discharge table 71 are mountings 75 and lifting devices 76, by means of which the individual slats are assembled into a slatted blind. However, these parts do not belong to the invention and, therefore, need not be described in detail here. It is sufficient to mention, in this respect, that a strip of material 77 is conveyed from the machining stations 72 and 73, according to the machining to be carried out in steps, successively up to individual stops and is conveyed further after each machining operation has been completed, until the strip of material 77 finally reaches the end stop 78 and initiates the cutting-off of the finished slat. The end stop 78 corresponds in its construction and its function to the end stop 44 of the exemplary embodiment described above. Until it reaches the end stop 78, the strip of material or the slat 77 is guided through guides, not shown here, in the region of the mountings 75 and through a pair of rollers 79.

I claim:

1. Apparatus for making slats for a slatted blind, said apparatus comprising, in combination:

(a) means for mounting a supply roll of slat-forming strip material;

(b) drive means effective to draw strip material from said supply roll;

(c) a guide channel positioned to receive a loop of said strip material drawn by said drive means to form a loop having an outer surface and an inner surface;

(d) a discharge table positioned to receive strip material from said guide channel;

(e) machining and/or assembly stations positioned in the region of said discharge table;

(f) an end stop associated with said discharge table movable to a predetermined position on said table for determining the length of the finished slat;

(g) an advancing member movable in the longitudinal direction of said guide channel and engagable by the end of said loop; and, (h) resilient means urging the advancing member towards said discharge table for effecting conveyance of the strip material onto said discharge table.

2. Apparatus as claimed in claim 1, wherein said advancing member comprises a concavely curved wall engageable by the outer surface of the end of the loop of the strip material.

3. Apparatus as claimed in claim 2, wherein said guide channel further comprises a stop limiting the return and conveying movement of the advancing member.

4. Apparatus as claimed in claim 3, wherein said stop comprises a roller engagable with the inner surface of the end of the loop, when a loop of a predetermined smallest length is reached during conveying movement of the advancing member, and wherein the radius of the roller is slightly less than the radius of curvature of the concavely curved wall.

5. Apparatus as claimed in claim 1, and further comprising a layer of low friction material provided on the surface of the advancing member engageable by the end of the loop of strip material.

6. Apparatus as claimed in claim 1, wherein said advancing member comprises a base part, and wherein said guide channel comprises two laterally spaced apart grooves facing one another, said base part being slidably guided by said grooves and wherein said resilient means engages one end of said base part.

7. Apparatus as claimed in claim 1, and further comprising a sensor positioned to detect the length of the loop, said sensor being operatively connected to said first drive means to reduce the speed of, or switch off, the first drive means when a predetermined length is exceeded, and to switch on or increase the speed of said first drive means, when loop length falls below a predetermined value.

8. Apparatus as claimed in claim 1 wherein said end stop is located on said discharge table and includes a fixed piston, a cylinder axially movable relative to said piston, means defining a stop body on said cylinder displaceable against the effect of a braking force until an end position is reached, and means defining an exhaust opening of the cylinder, the size of the opening determining the speed at which air within said cylinder flows out of said cylinder as the stop body is moved towards said end portion and thereby determining the braking effect whereby the braking force is reduced shortly before the end position is reached.

9. Apparatus as claimed in claim 8, wherein said piston is mounted at one end, the open end of the cylinder being passed over the other end of the said piston and movable towards said one end, the said open end of the cylinder being provided with a reduced diameter portion leaving an annular clearance between said piston and said portion to form said exhaust opening, said piston comprising, adjacent to the said one end, a part of reduced cross-section, whereby when said reduced diameter portion overlies said reduced cross-section part, the clearance increases shortly before the end position of the cylinder is reached.

10. Apparatus as claimed in claim 8, further comprising a thin helical spring surrounding the cylinder, an annular radially outwardly extending attachment on the cylinder, one face of which is engageable by the strip material and forms the stop body, and the other face of which is engageable by said helical spring whereby said spring can return said cylinder to its original position.

11. Apparatus as claimed in claim 10 and further comprising a holding device for the stop body, means defining a cylindrical bore in said holding device, the diameter of which corresponds to the diameter of the annular attachment on the cylinder and acts to guide said annular attachment, and means defining at least one lateral slit communicating with said bore through which a finished slat can be pushed out.

12. Apparatus as claimed in claim 8, wherein said piston further comprises a signal transmitter capable of transmitting a signal when the end position of said cylinder is reached.

* * * * *